United States Patent

Pham

[11] Patent Number: 5,930,415
[45] Date of Patent: Jul. 27, 1999

[54] MONITORING DEVICE FOR A GAS-INSULATED CABLE

[75] Inventor: Van Doan Pham, Meyzieu, France

[73] Assignee: GEC Alsthom T & D SA, Paris, France

[21] Appl. No.: 08/943,315

[22] Filed: Oct. 14, 1997

[30] Foreign Application Priority Data

Oct. 14, 1996 [FR] France ................... 96 12488

[51] Int. Cl.⁶ ............... G02B 6/00; G01M 3/28
[52] U.S. Cl. ................ 385/13; 385/12; 174/24; 356/44
[58] Field of Search ............ 385/12–13; 174/24; 356/43–44

[56] References Cited

U.S. PATENT DOCUMENTS

| | | | |
|---|---|---|---|
| 4,403,152 | 9/1983 | Schmid et al. | 250/551 |
| 4,812,013 | 3/1989 | Aurouet et al. | 350/96.29 |
| 5,164,999 | 11/1992 | Shifflett | 385/12 |
| 5,569,840 | 10/1996 | Thuries | 73/40 |
| 5,571,989 | 11/1996 | Thuries et al. | 174/24 |

FOREIGN PATENT DOCUMENTS

| | | | |
|---|---|---|---|
| 0673098A1 | 9/1995 | European Pat. Off. | 356/44 |
| 2674337A1 | 9/1992 | France | 356/44 |
| 2719125A1 | 10/1995 | France | 73/49 |
| 9417339U1 | 4/1996 | Germany | 356/44 |
| 19514981A1 | 12/1996 | Germany | 356/44 |
| WO96/30987 | 10/1996 | WIPO | 356/44 |

OTHER PUBLICATIONS

Patent Abstracts of Japan, vol. 11, No. 243 (P–603), Aug. 8, 1987 corresponding to JP 62 052424 A (Matsushita) dated Mar. 7, 1987.
Patent Abstracts of Japan, vol. 12, No. 95 (P–681), Mar. 29, 1988 corresponding to JP 62 229037 A (Matsushita Electric) dated Oct. 7, 1987.

*Primary Examiner*—John D. Lee
*Assistant Examiner*—Victoria D Hao
*Attorney, Agent, or Firm*—Sughrue, Mion, Zinn Macpeak & Seas, PLLC

[57] ABSTRACT

A gas-insulated cable includes a plurality of sections separated by sealed partitions, each section including a cylindrical steel case, a cylindrical aluminum screen coaxial with and inside the case and three conductors. A monitoring device includes, between the case and the screen, optical fibers equal in number to the number of sections of the cable and extending from one end to the other of the cable, each of the sections being monitored by a single fiber. The monitoring device further includes at least one optical internal arc detector inserted in series into each fiber in the corresponding monitored section, at each end of the device, a device for detecting light conveyed by the optical fibers, and at least one optical threshold temperature detector inserted in series into each fiber in the corresponding monitored section.

9 Claims, 2 Drawing Sheets

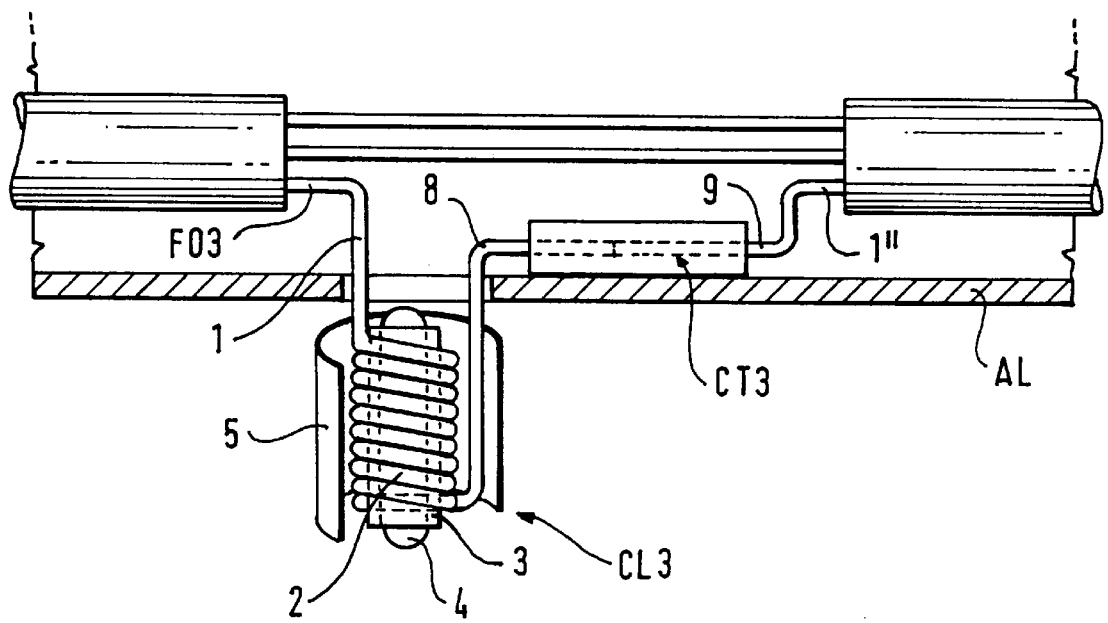
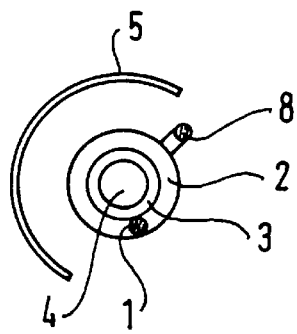
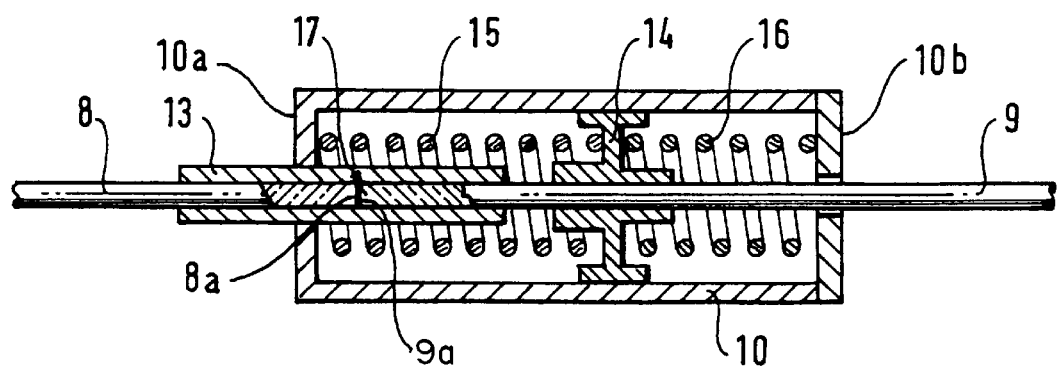

MONITORING DEVICE FOR A GAS-INSULATED CABLE

BACKGROUND OF THE INVENTION

1. Field of the Invention

The present invention concerns a monitoring device for a gas-insulated cable. The present invention is more particularly concerned with a device for detecting and locating an internal arc and for detecting if a temperature threshold value is exceeded in a gas-insulated electrical cable.

2. Description of the Prior Art

An electrical cable of the above kind is described in U.S. Pat. No. 5,571,989.

It includes a sealed steel cylindrical outer case in which three phase conductors are disposed parallel to the axis of the case. An aluminum case is disposed between the conductors and the steel case, very near the latter, and constitutes a magnetic screen to reduce heating of the steel case. The cable is made up of a plurality of sections, a section being made up by butt welding on site cable elements assembled in the factory. Each cable element comprises a steel case element, an aluminum case element and three conductors held in position by insulative arms; a cable element of this kind is about ten meters long, a section comprising around ten elements being approximately 100 meters long. The cable is filled with insulative gas such as pressurized nitrogen. The above document also indicates that two adjacent sections are separated by a partition, one function of which is to provide a seal between the two sections.

A device for detecting an internal arc for a gas-insulated electrical cable of the above kind is described in French patent application 96 01 131.

The device for detecting an internal arc for a gas-insulated cable includes, disposed between the case and the screen, optical fibers equal in number to the number of cable sections and extending from one end to the other of the cable, each of the sections being monitored by a single fiber, the fiber assigned to monitoring a section including, in that section, a light sensor inserted in series in the fiber, the device including at each end, means for detecting the light conveyed by the optical fibers in the event of an internal arc in a section.

Another important parameter to be detected is the temperature of the sections. This temperature is an increasing function of $I^2R$ losses in the section. The detection of a temperature above a predetermined threshold temperature can originate in abnormally high $I^2R$ losses due to poor contact or to defective welds in the section concerned.

An aim of the present invention is to design a monitoring device using a single fiber to detect and locate an internal arc, even of low intensity, and for detecting if a threshold temperature is exceeded.

SUMMARY OF THE INVENTION

To this end, the invention consists in a monitoring device for a gas-insulated cable including a plurality of sections separated by sealed partitions, each section including a cylindrical steel case, a cylindrical aluminum screen coaxial with and inside the case and three conductors, the sensor device comprising, disposed between the case and the screen, optical fibers equal in number to the number of sections of the cable and extending from one end to the other of the cable, each of the sections being monitored by a single fiber, at least one optical internal arc detector inserted in series into each fiber in the corresponding monitored section, at each end of the device, means for detecting light conveyed by the optical fibers, and at least one optical threshold temperature detector inserted in series into each fiber in the corresponding monitored section.

Another aim of the present invention is to propose an improved optical internal arc detector.

To this end, the optical internal arc detector includes a stripped silica optical fiber element connected in series to the monitoring optical fiber and forming a winding around a thin and transparent glass tube, the winding and the tube being disposed inside the space defined by the cylindrical screen.

The optical internal arc detector advantageously has a reflective surface disposed coaxially in the thin and transparent glass tube.

The optical internal arc detector can have a semi-cylindrical reflective surface disposed coaxially around the winding.

Finally, the invention concerns an optical threshold temperature detector which includes a first optical fiber element connected in series to the upstream monitoring optical fiber and a second optical fiber element connected in series to the downstream monitoring optical fiber, each optical fiber element having a polished free transverse face; guide means for holding the polished free transverse faces facing and parallel to each other whilst allowing relative axial movement of one fiber element relative to the other; first spring means for forcing the polished transverse faces into contact; and second spring means opposing the first spring means; at least one of the first and second spring means having a stiffness that varies as a function of temperature, the stiffnesses being calibrated so that above a predetermined threshold temperature of the first and/or the second spring means the resultant force Rf moves the polished transverse faces away from each other and below the predetermined threshold temperature of the first and/or second spring means the resultant force bring the polished transverse faces into contact.

In one embodiment the optical threshold temperature detector includes a piston fastened to one optical fiber element and moving axially in an axial enclosure surrounding the two polished transverse faces, fastened to the other of the optical fiber elements, the resultant force acting on the piston.

The first and second spring means are advantageously respectively a first spring and a second spring operative in opposition between the piston and the enclosure.

The guide means of the optical threshold temperature detector advantageously include a tube having an inside diameter equal to the diameter of the optical fiber elements fastened coaxially to and extending one of the fiber elements, the other of the fiber elements being free to move in axial translation in the tube.

Other advantages and features of the present invention will become apparent from the following description given with reference to the accompanying drawings.

BRIEF DESCRIPTION OF THE DRAWINGS

FIG. 2 is a schematic representation of a gas-insulated cable monitoring device in accordance with the invention.

FIG. 3 is a schematic representation of an optical internal arc detector.

FIG. 4 is a schematic representation of an optical threshold temperature detector.

DETAILED DESCRIPTION OF THE PREFERRED EMBODIMENT

Figure 1:
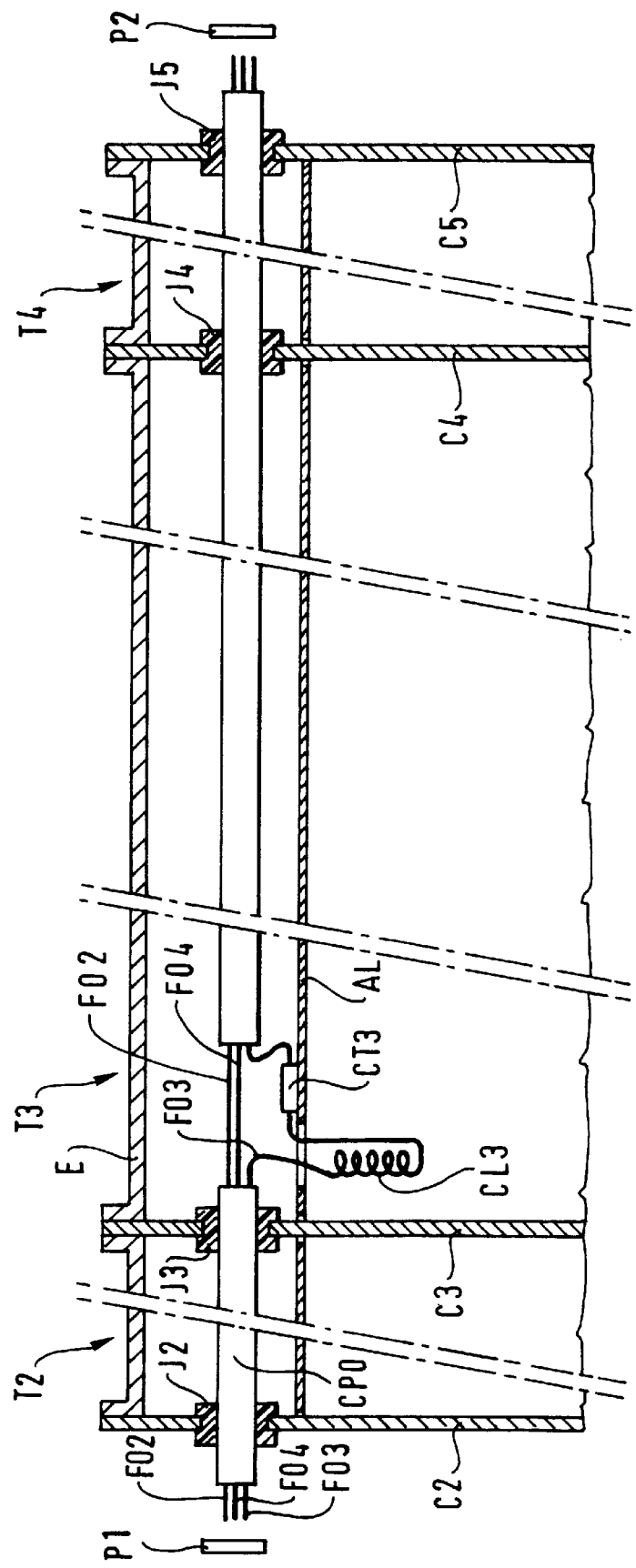
FIG. 1 is a schematic representation of a multisection gas-insulated electrical cable using the invention.

FIG. 1 represents schematically a gas-insulated electrical cable with three sections T2 through T4. To clarify the drawing, only the outer case E and the aluminum screen AL of the sections and the partitions C2 through C5 delimiting the various sections are shown.

Detection is effected by means of optical fibers equal in number to the number of sections and which extend from one end to the other of the electrical cable.

Each optical fiber is assigned to monitoring a particular section.

The fiber assigned to monitoring a given section is associated with at least one internal arc detector and at least one threshold temperature detector that will be defined below.

A light detecting element P1, P2, such as a photographic plate or photographic paper responsive to light transmitted by the appropriate fiber, or an opto-electrical converter or equivalent device, is placed at one end at least of the fibers F02 through F04. Light detecting elements P1 and P2 are preferably placed at each end of the optical fibers, very close to them, as shown in FIG. 1.

FIG. 1 shows the section T3 adjacent the sections T2 and T4 and separated from the latter by respective partitions C3 and C4.

The fibers are disposed in the space between the steel outer case E of the electrical cable and the aluminum screen AL.

The fibers are disposed in a common sheath made from an insulative material with good arc resistance, such as PTFE. The optical cable CPO formed in this way extends from one end to the other of the electrical cable, passing through the partitions at which they are sealed, for example by seals J2, . . . , J3, etc. The seals are preferably made from heat-shrink material. To facilitate drawing the optical cable through the partitions it is beneficial to use seals with sufficient clearance. A seal is assured after installing the optical cable by heating the heat-shrink seals.

The monitoring device for each section is made up as follows (see FIG. 2).

The optical cable is stripped near one end of the section, for example near the partition C3, over a short portion (10 cm to 50 cm, for example), and the optical fiber FO3 assigned to monitoring section T3 is cut at this location to define an upstream end 1 and a downstream end 1". The upstream end 1 of the fiber is connected by a connector to an optical internal arc detector CL3. An optical threshold temperature detector CT3 is connected in series between the end of the optical internal arc detector CL3 opposite the end 1 of the monitoring optical fiber FO3 and the downstream end 1".

In an embodiment shown in FIGS. 2 and 3 the optical internal arc detector CL3 includes a stripped silica optical fiber element 2 connected in series with the end 1 of the monitoring optical fiber FO3 forming a winding 2 around a thin and transparent glass tube 3. The winding 2 and the tube are disposed inside the space defined by the cylindrical screen (AL) so as to pick up light from internal arcs (see FIGS. 2 and 3).

In one embodiment, and for amplifying the light, the optical internal arc detector CL3 has a reflective surface 4 disposed coaxially in the thin and transparent glass tube 3. This surface 4 can be a polished aluminum rod having a diameter equal to the inside diameter of the tube, for example, or a reflective film deposited onto the inside face of the tube.

For the same reasons (light amplification), the optical internal arc detector CL3 can have a semi-cylindrical reflective surface 5 disposed coaxially with and near the thin and transparent glass tube 3 and the winding 2.

An optical threshold temperature detector CT3 is connected in series to the end of the winding 2 opposite the end 1 of the monitoring optical fiber FO3.

In one embodiment the optical threshold temperature detector CT3 includes a first optical fiber element 8 connected in series to the winding 2 of the optical internal arc detector CL3 and a second optical fiber element 9 connected in series to the downstream end 1" of the monitoring optical fiber FO3. Each optical fiber element 8, 9 has a polished free transverse face 8a, 9a.

The optical threshold temperature detector CT3 includes guide means 10, 14, 13 to hold the polished free transverse faces 8a, 9a coaxial, facing and parallel to each other, whilst allowing relative axial movement of one fiber element 8, 9 relative to the other 9, 8.

The threshold temperature detector further includes first spring means 16 for forcing the polished transverse faces 8a, 9a into mechanical contact at 17 and second spring means 15 opposing the first spring means 16.

At least one of the first and second spring means 16, 15 has a stiffness that varies as a function of temperature, the variable or constant stiffnesses being calibrated so that above a predetermined threshold temperature Ts of the first spring means 16 and/or the second spring means 15 the resultant force Rf moves the polished transverse faces away from each other, and below the predetermined threshold temperature of the first spring means and/or the second spring means the resultant force Rf brings the polished transverse faces into contact.

In one embodiment of the invention the optical threshold temperature detector includes a piston 14 fastened to the downstream optical fiber element 9 moving axially in an axial enclosure 10 surrounding the two polished transverse faces 8a, 9a.

The piston 14 and the axial enclosure 10 constitute part of the guide means of the downstream optical fiber element.

The axial enclosure 10 is fastened to the upstream optical fiber element 8.

The polished free transverse face 8a of the upstream optical fiber element 8 is extended coaxially by and fastened to a tube 13 having an inside diameter equal to the diameter of the optical fiber elements 8, 9, the downstream fiber element 9 being free to move in axial translation in the tube 13. The tube 13 constitutes another part of the guide means of the detector and in combination with the assembly comprising the piston 14 and the enclosure 10 assures good coaxiality of the facing polished free transverse faces 8a, 9a whilst allowing relative axial movement of the fiber elements 9, 8.

The resultant force Rf acts on the piston 14.

In the embodiment shown in the figures, the first and second spring means 16, 15 are respectively first and second springs 16, 15 operative in opposition between the piston 14 and the enclosure 10.

In FIG. 4 the enclosure 10 includes an upstream transverse base 10a and a downstream transverse base 10b with respective holes in them through which pass the upstream fiber element 8 and the downstream fiber element 9, respectively. The downstream transverse base 10b allows free passage of the downstream fiber element 9, the upstream transverse base 10a being fastened to the guide tube 13.

Furthermore, the first and second springs 16, 15 are respectively in compression between the upstream transverse base 10*a* and the piston 14 and between the downstream transverse base 10*b* and the piston 14.

Either or both of the springs 16, 15 can have a stiffness that varies with temperature. The springs 16, 15 can be made from materials with a shape memory, for example.

In the embodiment proposed, the first spring 16 is a standard material spring and the second spring is a shape memory material spring such that up to the predetermined temperature Ts, for example 90° C., the second spring has a first shape inducing a resultant force Rf bringing the polished transverse faces 8*a,* 9*a* into contact and at the predetermined threshold temperature Ts the second spring assumes a second shape inducing a resultant force Rf moving the polished transverse faces 8*a,* 9*a* strongly apart. By "strongly" is meant a separation between the transverse faces that significantly affects the transmission of light.

The enclosure 10 of the threshold temperature detector Ts is in thermal contact with the screen AL.

The operating principle of the monitoring device of the invention is as follows: for a given section, the arc detector being upstream of the threshold temperature detector, the light emitted by an internal arc is picked up by the winding 2. The inside diameter of the winding is advantageously 8 mm to 10 mm so that an adequate radius of curvature can be imparted to the fiber so that light rays impinging tangentially on the winding penetrate the fiber. The captured light is conveyed by the fiber to the light detecting elements.

If the temperature of the threshold temperature detector is below the threshold temperature, the facing polished free transverse faces 8*a,* 9*a* are in mechanical contact due to the action of the resultant force Rf. Accordingly, the optical coupling between the upstream and downstream fiber elements 8, 9 is optimal and the upstream light detecting element receives the same luminous energy as the downstream light detecting element.

If the temperature of the threshold detector is above the threshold temperature the facing polished free transverse faces 8*a,* 9*a* are still coaxial but are separated from each other due to the action of the resultant force. Accordingly, the optical coupling is significantly affected by the air between the facing polished free transverse faces 8*a,* 9*a.* The upstream light detecting device receives without any attenuation luminous energy captured by the arc detector whereas the downstream light detecting element receives only a portion of it because of the attenuation due to the air between the facing polished free transverse faces 8*a,* 9*a.*

In an embodiment that is not shown a selectively operable light source is provided near the light detector. This selectively operable source makes it possible to determine if the threshold temperature is exceeded independently of the existence of an electrical arc.

The light source is intentionally activated for the necessary time period and comparing the luminous energies received by the downstream and upstream light detecting elements indicates whether the threshold temperature is exceeded or not, with no electrical arc present.

In another embodiment a light source is substituted for one of the light detecting devices P1, P2 either at a chosen time interval or in response to detection of a malfunction to observe which of the optical fibers FO2, . . . , FO4 is not transmitting light to the remaining detecting device P2, P1. The section in which the temperature has exceeded the predetermined temperature threshold Ts could then be deduced logically from this.

Of course, the invention is not limited to the embodiment or the application described and shown but is open to many variants evident to the skilled person that do not depart from the scope of the invention. In particular, the number of detectors per section can be doubled or tripled as a safety measure without departing from the scope of the invention. Likewise the relative positions of the detectors can vary without departing from the scope of the invention.

There is claimed:

1. A monitoring device for a gas-insulated cable comprising:
    a plurality of sections separated by sealed partitions, each section including:
        a cylindrical steel case,
        a cylindrical aluminum screen coaxial with and inside said case, and three conductors,
        a plurality of optical fibers disposed between said case and said screen equal in number to a number of said sections of said cable and extending from one end to the other of said cable,
    wherein each of said sections is monitored by a single optical fiber of said optical fibers,
    at least one optical internal arc detector is inserted in series into each single fiber in the corresponding monitored section, at each end of said device,
    a detector which detects light conveyed by said optical fibers, and
    at least one optical threshold temperature detector inserted in series into each single fiber in the corresponding monitored section;
    wherein said optical threshold temperature detector comprises:
        a first optical fiber element and a second optical fiber element, and
        a mechanism for allowing relative axial movement of said first optical fiber element relative to said second optical fiber element.

2. The monitoring device claimed in claim 1 wherein said optical internal arc detector comprises a stripped silica optical fiber element connected in series to said monitoring optical fiber and which forms a winding around a thin and transparent glass tube, said winding and said tube being disposed inside a space defined by said cylindrical screen.

3. The monitoring device claimed in claim 2 wherein said optical internal arc detector has a reflective surface disposed coaxially in said thin and transparent glass tube.

4. The monitoring device claimed in claim 2 wherein said optical internal arc detector has a semi-cylindrical reflective surface disposed coaxially around said winding.

5. A monitoring device for a gas-insulated cable comprising:
    a plurality of sections separated by sealed partitions, each section comprising:
        a cylindrical steel case,
        a cylindrical aluminum screen coaxial with and inside said case, and three conductors,
        a plurality of optical fibers disposed between said case and said screen equal in number to a number of said sections of said cable and extending from one end to the other of said cable,
    wherein each of said sections is monitored by a single optical fiber of said optical fibers,
    at least one optical internal arc detector is inserted in series into each single fiber in the corresponding monitored section, at each end of said device,
    a detector which detects light conveyed by said optical fibers, and at least one optical threshold temperature detector inserted in series into each single fiber in the corresponding monitored section, wherein said optical threshold temperature detector comprises:

a first optical fiber element connected in series to an upstream monitoring optical fiber, and a second optical fiber element connected in series to a downstream monitoring optical fiber, each optical fiber element having a polished free transverse face;

guide means for holding said polished free transverse faces of said first optical fiber element and said second optical fiber element facing and parallel to each other whilst allowing relative axial movement of one fiber element relative to the other;

first spring means for forcing said polished transverse faces into contact; and second spring means opposing said first spring means;

wherein at least one of said first and second spring means has a stiffness that varies as a function of temperature, the stiffness being calibrated so that above a predetermined threshold temperature of at least one of the first and the second spring means, the resultant force Rf moves said polished transverse faces away from each other, and below said predetermined threshold temperature of said at least one of first and second spring means, said resultant force brings said polished transverse faces into contact.

6. The monitoring device claimed in claim 5 wherein said optical threshold temperature detector includes a piston fastened to one optical fiber element and moving axially in an axial enclosure surrounding said two polished transverse faces fastened to the other of said optical fiber elements, said resultant force acting on said piston.

7. The monitoring device claimed in claim 6 wherein said first and second spring means are respectively a first spring and a second spring operative in opposition between said piston and said enclosure.

8. The monitoring device claimed in claim 7 wherein said second spring is made from a shape memory material so that up to said predetermined threshold temperature said second spring has a first shape inducing a resultant force bringing said polished transverse faces into contact and at said predetermined threshold temperature said second spring has a second shape inducing a resultant force strongly moving said polished transverse faces away from each other.

9. The monitoring device claimed in claim 6 wherein said guide means of said optical threshold temperature detector comprises a tube having an inside diameter equal to a diameter of said optical fiber elements fastened coaxially to and extending one of said fiber elements, the other of said fiber elements being free to move in axial translation in said tube.

* * * * *